United States Patent [19]

Withoos et al.

[11] Patent Number: 4,622,560

[45] Date of Patent: Nov. 11, 1986

[54] LINE-WISE INTERFERENCE/BAND SUPPRESSION PRINTING SYSTEM

[75] Inventors: Wilhelmus H. C. Withoos; Petrus J. M. Leenders, both of Eindhoven; Franciscus H. C. Benning, Utrecht; Johannes van de Meij, Eindhoven, all of Netherlands

[73] Assignee: U.S. Philips Corporation, New York, N.Y.

[21] Appl. No.: 759,544

[22] Filed: Jul. 26, 1985

[30] Foreign Application Priority Data

Jul. 26, 1984 [NL] Netherlands ............... 8402353

[51] Int. Cl.$^4$ ............... G01D 15/10; B41J 3/10
[52] U.S. Cl. ............... 346/1.1; 346/46 PH; 346/140 R; 161/93.01; 161/93.04; 161/93.05; 400/120; 400/124; 400/126
[58] Field of Search ............... 346/1.1, 76 PH, 140 R; 400/120, 124, 126; 101/93.01, 93.04, 93.05

[56] References Cited

U.S. PATENT DOCUMENTS 4,374,385 2/1983 Yoshizari et al. ............... 346/1.1
4,508,463 4/1985 Wang et al. ............... 400/124
4,520,371 5/1985 Firth, III et al. ............... 346/76 PH
4,540,996 9/1985 Saito ............... 346/140 R Primary Examiner—E. A. Goldberg
Assistant Examiner—Gerald E. Preston
Attorney, Agent, or Firm—Robert T. Mayer; Bernard Franzblau

[57] ABSTRACT

The line-wise printing of an image composed of an assembly of image elements (pixels) by means of a printing head which includes a row of N (N≧2) printing elements which are arranged along an image line at a mutual distance from each other. The printing stroke is greater than the distance between two neighboring printing elements so that there is created at least one strip in the image in which there are pixel positions which are covered by m (2≦m≦N) printing heads. For this strip (or strips) several options are then presented for printing the pixels situated within them. A pixel in such a strip can now be printed by one or by several of the m printing elements, the allocation of one or more of these m printing elements to a position being capable of being chosen as fixed or variable. Furthermore, it is possible, if a pixel can be printed by several printing elements, to distribute the pixel printing values of the relevant pixel point over these several printing elements according to a fixed or variable distribution code.

26 Claims, 18 Drawing Figures

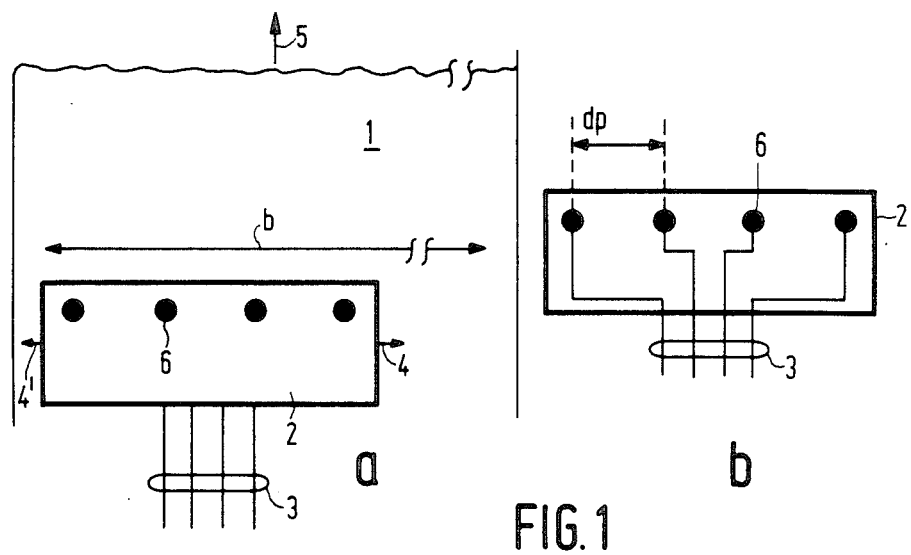
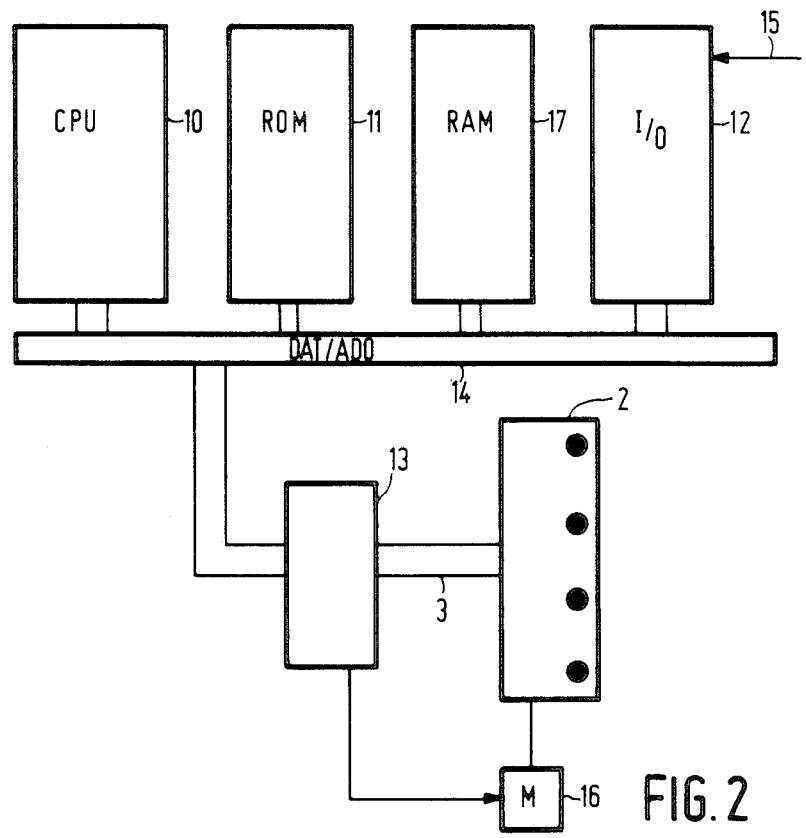
FIG. 1
FIG. 2

LINE-WISE INTERFERENCE/BAND SUPPRESSION PRINTING SYSTEM

The invention relates to a method for the linewise printing of a image composed of an assembly of picture elements (pixels) by means of a printing head, which printing head embodies a row of $N(N \geq 2)$ which are arranged along an image line at a mutual distance from each other, which mutual distance is greater than the distance between two successive pixels in the same picture line, which printing head is moved during a printing stroke in the direction of an image line to be printed, and in which process a first control signal is generated for each pixel to be printed for the single-color printing of that pixel.

Such a method is known from the British patent application GB PA No. 2 025 725. In the known method an image, which is composed of an assembly of pixels, is printed by causing the printing head to move in the direction of such an image line for each image line to be printed. Each of the printing elements of the printing head then prints a number of successive positions of such an image line during the same printing stroke and each position of such an image line is covered by only one printing element during the printing of the same color. The printing stroke corresponds to the mutual distance between two successive printing elements, which mutual distance is the same for all the printing elements in the pinting head. After the printing of an image line, the carrier on which the image is being printed is displaced in a direction perpendicular to the image line in order to print a next image line. For each pixel to be printed a first control signal is generated, which first control signal has an intensity which matches the pixel print value of the relevant pixel. The printing of a pixel then takes place by activating the printing element which covers the image position to be printed under the control of the relevant first control signal.

A disadvantage of the known method is that each position within a line is covered only by the same printing element. As a result of this, in the line-wise printing of an image, in particular a graphic image, or in the printing of half tones, interference patterns arise in the printed image which disturb the optical density of the printed image. These interference patterns are characterized, for example, by a line pattern between successive strips of pixels which are printed by the same printing element, or by large differences in optical density which results in a pattern of bands in the picture. The interference and/or band patterns arise as a result of geometrical and/or electrical inaccuracies in one or more printing elements of the printing head, and become all the more pronounced if a strip of successive pixels in successive image lines are printed by such a same printing element with an inaccuracy.

The object of the invention is to provide a method for the line-wise printing of a image composed of an assembly of pixels by means of a printing head, in which method the said interference and/or band patterns are suppressed.

In a method according to the invention the printing stroke is larger than the distance between two neighboring printing elements and for at least one strip of pixels which extends transversely to the image line direction and which, for each image line, contains several pixels which are each image by m $(2 \leq m \leq N)$ printing elements, there is allocated to each pixel situated in the same image line and in such a strip one of the m said printing elements, which allocation is achieved by printing a pixel situated later in the image line by means of a printing element disposed earlier in the said row and by printing a pixel situated earlier in the image line by means of a printing element disposed later in the same row, each pixel being printed by the energizing of the printing element allocated to it under the control of the respective first control signal.

Because the printing stroke is now greater than the distance between two neighboring printing elements, there is produced in the image strips of pixels which are covered by m printing elements. As a result the opportunity is now presented of selecting for each pixel in such a strip which of these m printing elements will print that pixel. Doing this has the result that successive pixels in such a strip may no longer be covered by the same printing elements but by different ones. The interference in the image caused by the fact that successive positions are printed by the same printing element which is beset with an inaccuracy is consequently suppressed. Thus, according to the invention one of the m printing elements is allocated to each pixel in such a strip. In making that allocation, however, a criterion is adhered to which takes into consideration the fact that successive pixels in the same image line in such a strip are actually printed by different printing elements. The actual printing of the pixels in such a strip is achieved by energizing the allocated printing elements under the control of the respective first control signal for the relevant pixel. The pixels which are located outside the said strip are printed in the known manner by the printing element which covers that position.

Furthermore, the fact that more than one printing element scans the same position presents the opportunity of making better allowance for the characteristics both of the printing device and of the printing head and may under certain circumstances make it possible to impose less stringent requirements on the quality of the printing head. Thus, allowance can be made for geometrical and electrical inaccuracies in a printing element or for printing elements which function less satisfactorily. Interference patterns resulting from any inaccuracy in one or more printing elements are now averaged out by the various elements which cover the relevant position or by the fact that a row of successive positions is now no longer necessarily has to be serviced by the same printing element. In thermal printing devices better allowance can be made for the cooling-down times of the printing elements.

An alternative solution for the suppression of the said interference patterns is described in the U.S. Pat. No. 4,374,385. The method described therein makes use of a printing device in which the printing head embodies an assembly of thermal printing elements. The thermal printing elements are activated under the control of a second control signals, each second control signal being derived from the first control signal. In the method known therefrom, after the printing of a first number of positions, the carrier is displaced over a distance which is substantially equal to half the length of the distance formed by the line-wise disposed printing elements. After this displacement, the printing elements are again activated and the positions which in the previous printing were situated between two successive printing elements are now printed in order to partially suppress the interference pattern.

However, during this displacement the carrier is displaced during the printing with respect to the printing head, which is not the case in a method according to the invention. This is a risky solution because the displacement of the carrier requires an extremely accurate mechanism for the carrier transport, which is very expensive. If the accuracy of the paper transport is insufficient, the interference pattern is virtually not suppressed. Furthermore, each position within a printing stroke is only covered by one printing element.

It is favorable for the said allocation of one of the said m printing elements to be undertaken in accordance with a predetermined distribution pattern.

This makes a simple implementation of the allocation of one of the said m printing elements possible, and presents the opportunity of creating a suitable distribution among the aforementioned m printing elements for each position in such a strip.

It is favorable, in the case where a strip contains more than two pixels, for the aforementioned allocation of one of the said m printing elements to be undertaken according to a distribution pattern, which distribution pattern is generated for each image line to be printed.

The generation of a distribution pattern for each image line to be printed presents the opportunity of making allowance for inaccuracies which are inherent in the printing head. Furthermore, this presents the opportunity of ensuring that a given printing element is used often or less often.

In an alternative embodiment of a method according to the invention in which each first control signal has an intensity which is matched to the pixel print value of the relevant, wherein the print stroke is larger than the distance between two neighboring printing elements and for at least one strip of pixels which extends transversely to the image line direction and which for each image line contains several pixels which are each covered by m ($2 \leq m \leq N$) printing elements, which pixels in such a strip are successively printed by p ($2 \leq p \leq m$) elements, there being generated for each pixel which is printed by p printing elements for activating each of the p printing elements a second control signal on the basis of portions of the intensity of the first control signal for that pixel, and that the sum of the intensities contained in all the second control signals for the same pixel is at least equal to the intensity in the first control signal for the relevant pixel.

Because a pixel position is covered by m printing elements it is possible to cause the relevant pixel to be successively printed by p of the said m printing elements. This achieves the result that successive pixels in such a strip may no longer be covered by the same printing elements but by different ones. To maintain the pixel print value of each of the pixels in such a strip it is necessary to split up the intensity of the first control signal for the p second control signals which each respectively energize one of the p printing elements for the printing. Since the sum of the intensities contained in all the second control signals for the same pixel is at least equal to the intensity in the first control signal for that pixel, the result is achieved that the pixel print value of the pixel is maintained. The aforementioned sum may even be somewhat greater than the intensity of the first control signal if, for example, for thermal printing elements allowance is made for warming-up effects. Because each of the p printing elements now prints a portion of the pixel, the inaccuracy of each of the p printing elements is smoothed out over the total.

It is favorable for the intensity contained in the first control signal for each pixel belonging to such a strip to be divided into p portions according to a predetermined distribution code, and for the p printing elements which in each case print each pixel in any strip according to a predetermined pattern to be selected from the aforementioned m printing elements.

This results in a simple solution for the division of the intensity into p fractions and for the selection of the said p printing elements from the said m printing elements.

For each pixel in any strip and belonging to the same image line it is favorable for a distribution code to be generated according to which the intensity contained in the first control signal for that pixel is divided into p portions, and for the p printing elements which in each case print each pixel in any strip to be selected according to a predetermined pattern from the aforementioned m printing elements.

The generation of a distribution code creates a degree of freedom in the splitting up of the intensity.

For each pixel in any strip belonging to the same image line it is favorable for a distribution pattern to be generated according to which p printing elements are selected from the m printing elements which cover that pixel and for the intensity contained in the first control signal for each pixel belonging to any strip to be divided into p portions according to a predetermined distribution code.

The generation of a distribution pattern creates a degree of freedom in the selection of the p printing elements.

It is favorable for the distribution code and/or the distribution pattern for each image line to be invariant. This makes it simple to achieve the control of the printing head and the printing according to the method of the invention.

In a preferred embodiment of the method according to the invention the distribution code for each pixel (j) to be printed contains p weighting factors ($P_{ij}$) ($1 < i < p$), the sum of all the weighting factors $$\left( \sum_{i=1}^{p} P_{ij} = c \right)$$

being equal to a constant value c ($1 < c < 1.5$).

Each of the weighting factors $P_{ij}$ then represents a portion of the intensity contained in the first control signal for the relevant position. The sum of in each case of p weighting factors for a pixel must be equal to a constant value which varies between 1 and 1.5 since no intensity must be lost from the first control signal. The reason for this is that loss of intensity from the first control signal would mean that the information is no longer being correctly printed.

Preferably the weighting factors for the same pixel are determined according to a probability distribution and the constant c is equal to 1. The probability distribution is for example a delta or a sinusoidal probability distribution. A probability distribution is simple to generate and guarantees a reasonable degree of smoothing.

It is favorable for the distance over which the printing head is moved during a printing stroke to be substantially equal to a whole (n) number of times the mutual distance between two successive printing elements of the printing head. The aforementioned whole number of times (n) is a value which is smaller than, or at most equal to, the number of pixels which fit into the distance between two successive printing elements of the printing head. This makes the control system for displacing the printing head simple and is sufficient to suppress the interference patterns to a large extent.

The invention also relates to a printing device for the line-wise printing of an image composed of an assembly of pixels, the device emmbodying a printing head which embodies a row of N (N≧2) printing elements which are disposed along a printing line at a mutual distance from each other, which mutual distance is greater than the distance between two successive pixel positions in the same image line which is to be printed, which printing head is provided with means of displacement for displacing the printing head during a printing stroke in the direction of an image line which is to be printed, which printing device embodies a first control signal generator for the generation of a first control signal for each pixel to be printed, which first control signal generator is connected to the printing head in order to supply first control signals to the printing elements.

Such a printing device is also known from the already mentioned British patent application GB PA No. 2 025 725.

In a printing device according to the invention the displacement means are provided for the displacement of the printing head within a complete printing stroke over a distance which is greater than the distance between two neighboring printing elements and the printing device embodies a selection unit which is provided for allocating, in at least one strip of pixel positions which extends transversely to the image line and which for each image line contains several pixel positions which can be printed by m (2≦m≦N) printing elements, at each of the pixel positions situated on the same image line and in such a strip, one of the said m printing elements by selecting for a pixel position situated later in a image line a printing element disposed earlier in the said aforementioned and by selecting for a pixel position situated earlier in that image line a printing element disposed later in the aforementioned row, the first control signal generator being connected to the selection unit in order to supply the first control signal to the selected printing element.

The means of displacement and the selection unit make possible the application of a method according to the invention.

It is favorable for the selection unit to embody a first memory in which a distribution pattern is stored according to which one of the aforementioned m printing elements can be selected at each of the pixel positions in such a strip.

If a fixed distribution pattern is used, a memory, for example a ROM, in which this distribution pattern is stored offers an advantageous solution.

In an alternative embodiment of a printing device according to the invention, in which each first control signal contains an intensity which is matched to the pixel print value of the relevant pixel, the displacement means are provided for the displacement of the printing head within a full printing stroke over a distance which is larger than the distance between two neighboring printing elements and the printing device embodies a second control signal generator connected to the first control signal generator for the generation of second control signals for the printing of pixel positions from at least one strip of pixel positions which extends transversely to the image line direction and which for each image line contains several pixel positions which can each be printed by m (2≦m≦N) printing elements, which second control signal generator is provided for the generation of p (2≦p≦m) second control signals for each pixel position in such a strip, each of the p second control signals being capable of being generated for the same pixel position on the basis of a portion of the intensity of the first control signal for that pixel position and the sum of the intensities contained in all the second control signals for the same pixel position being at least equal to the intensity in the first control signal for that pixel position, and the printing device includes a selection unit which is provided for the selection of p different printing elements from the aforementioned m printing elements, which selection unit is connected to the print head and to the second control signal generator in order to supply the aforementioned p second control signals to the aforementioned p printing elements.

The displacement means and the second control signal generator make possible the use of this alternative embodiment of a method according to the invention.

Preferably the printing head is provided with thermal printing elements. Geometrical and electrical inaccuracies in the printing elements are common in the case of thermal printing elements so that when such thermal printers are used, interference patterns often occur, and these are particularly annoying if several colors are used for printing.

The invention will be explained in further detail with reference to the drawings in which:

FIG. 1a illustrates diagrammatically the relative movement of the printing head and the carrier;

FIG. 1b illustrates the surface of a printing head which is brought into contact with a carrier;

FIG. 2 shows an exemplary embodiment of a printing device;

Figure 5:
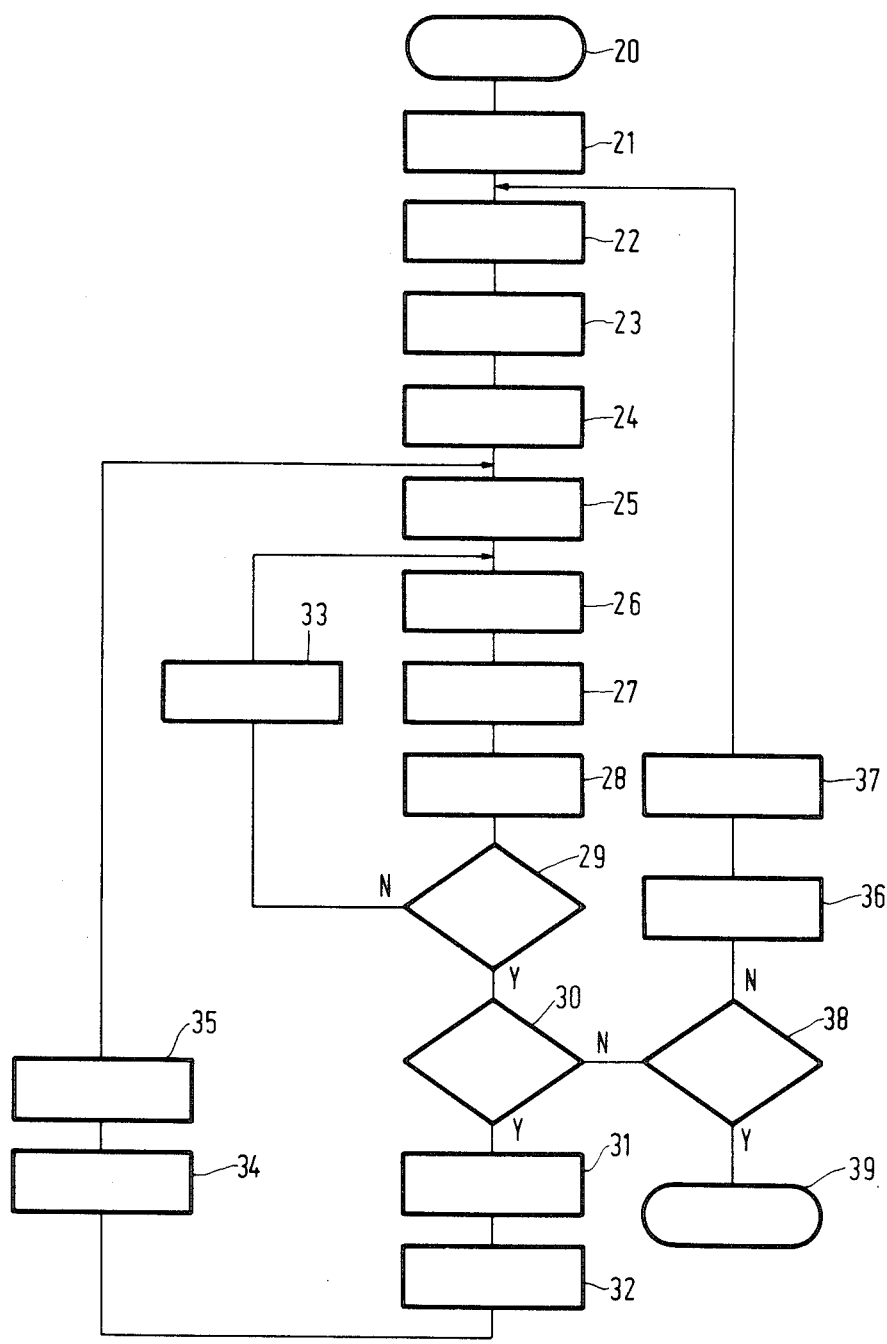
Figure 7:
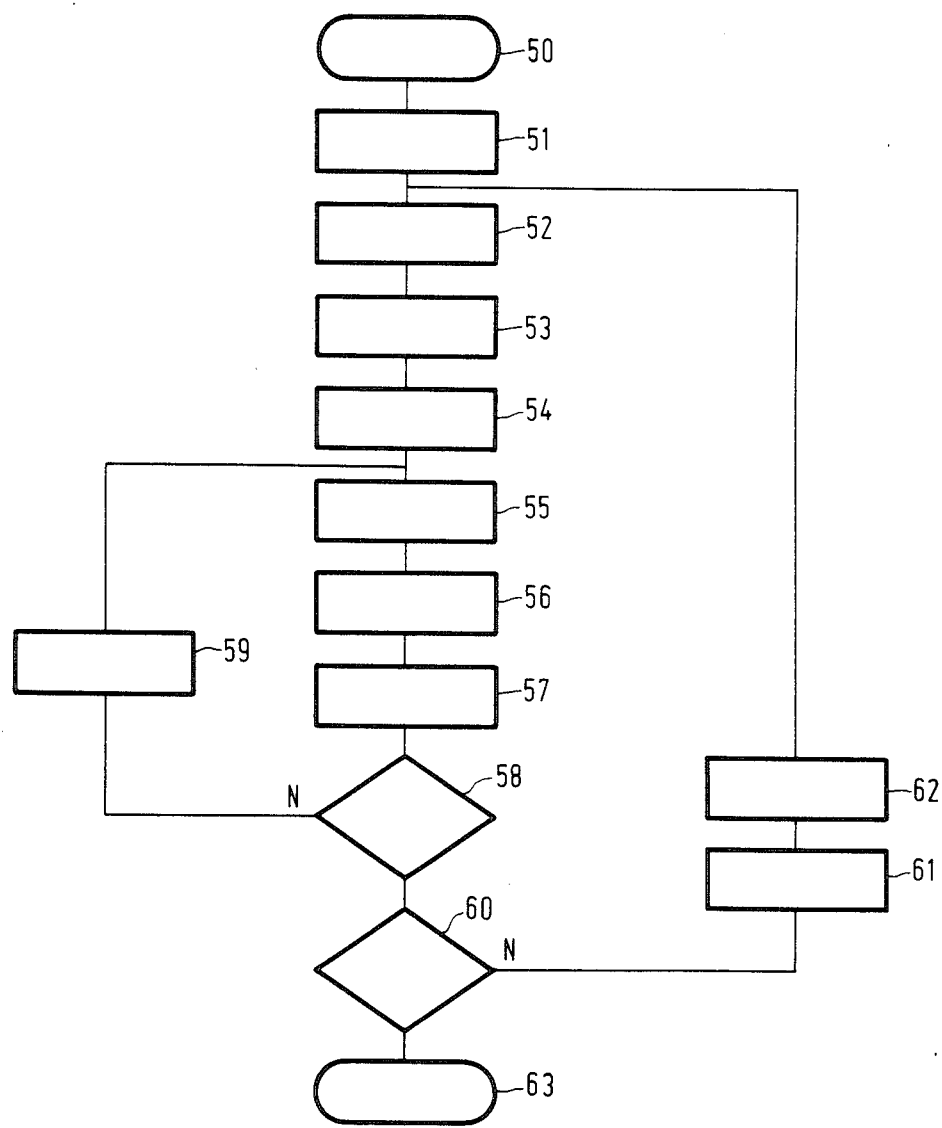

FIGS. 4a, b, c, to d incl. illustrate a first preferred embodiment of a method according to the invention;

FIG. 4e shows a delta probability distribution pattern which is used in the first preferred embodiment of a method according to the invention;

FIG. 4f depicts a manner of assigning weighting factors per position to the printing elements;

FIG. 5 illustrates the operations carried out in a first preferred embodiment of a method according to the invention on the basis of a first flow chart;

FIGS. 6a, b, c, d, e to f incl. illustrate a second preferred embodiment of a method according to the invention;

FIG. 7 illustrates the operations carried out in a second preferred embodiment of a method according to the invention on the basis of a second flow chart.

FIG. 1a illustrates diagrammatically the relative movement of a printing head and the carrier in a preferred embodiment of a printing device in which a method according to the invention is used. This printing device embodies a printing head 2 which can be moved across a carrier, for example a paper 1. The paper moves in the direction of the arrow 5. The printing head 2 moves in the direction of the arrow 4 during the printing of a image line, and in the direction 4' during the return stroke of the printing head. The printing head embodies a number N(N≧2) of printing elements 6 which are disposed in a line, which line has substantially the same direction as the direction of motion of the printing head. The printing elements 6 are therefore placed perpendicular to the direction of movement of the paper. FIG. 1b illustrates the surface of the printing head 2 which is brought into contact with the paper. The printing element 6, which are dot-shaped or line-shaped, are placed at a mutual distance dp from each other which is termed the "printing element pitch". The printing element pitch is larger than the distance between two successive pixels in the same image line. Each printing element is connected to a control line for the transmission of control signals for the activation of the printing element. The various control lines are assembled in a control bus 3. During a full movement, termed a "printing stroke," the printing head traverses a width b across the paper and prints a image line on the paper.

The invention will be described by reference to a preferred embodiment in which the printing element 6 take the form of thermal printing elements. The printing device will therefore be described as a "thermal printing device". The printing elements embody a resistance element and a control signal takes the form of a current pulse. Under the influence of such a current pulse a printing element is heated up. This heat is transferred to the paper. The paper has been treated, for example, with a chemical substance which, as a result of heat being supplied, locally undergoes a change or, for example, a layer of wax paper is introduced between the printing head and the carrier. The use of colored wax paper makes color printing possible. It will be clear that other printing elements such as, for example, printing needles or ink-jet printers, can also be used in the application of the invention.

An image is printed line-wise on the paper and each line is built up of an assembly of pixels which are printed by the dot-shaped or line-shaped printing elements. The printing elements are activated under the control of control signals and in each case between two successive series of control signals the printing head is moved to a small extent in the direction of the arrow 4. In known printing devices the printing stroke is substantially equal to the printing element pitch.

FIG. 2 shows an example of a device for the printing of information. This device embodies a CPU 10, a read memory 11, for example a ROM, and a read/write memory 17, for example a RAM, and also an input/output interface 12, which are interconnected by means of a system bus 14 for the transmission of data and addresses. To the system bus 14 there is further connected a printing head control element 13, which in its turn is connected via the control bus 3 to the printing head 2. The printing head control element 13 is further connected to a motor 16 which is responsible for the movement of the printing head. The input/output interface 12 has a number of connection lines 15 over which the information to be printed (for example, originating from a teletext receiver) is supplied. In the read memory 11 there are stored, inter alia, programs for the control of the printing head. These programs are performed in the known manner under the control of the CPU. Under control of the CPU and with the help of a program the information supplied via the input/output interface 12 is translated into control signals which are fed to the printing head control element via the system bus 14. Each control signal contains an intensity which is matched to the pixel print value of the pixel to be printed, and is then converted at this point into energy for the activation of a printing element. In the case of a thermal printer this energy takes the form of electrical current pulses. The duration and/or the current strength of these electrical current pulses is variable as a function of the pixel print value of the pixel to be printed. As a result of this the quantity of heat transferred to the paper varies.

Figure 3:
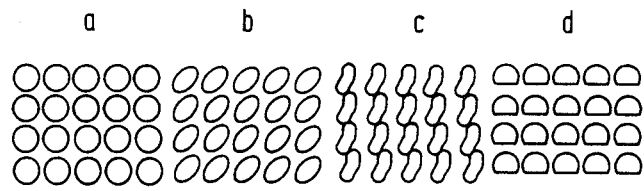
FIG. 3 shows a number of pixels in magnified format as printed by a conventional method.
Figure 3:

FIG. 3 shows in enlarged format a number of image elements such as printed by a method in which the print stroke is equal to the element pitch. It is assumed that the printing head embodies four printing elements which are indicated by the capital letters A, B, C and D. A full printing stroke is made up of a number of substrokes (in this example, 5), and each printing element prints a pixel on the paper during such a substroke, which pixels lie on the same line. During one printing stroke a number of pixels are therefore printed. In the initial FIG. 3 four successive printing strokes are illustrated. The assembly of pixels a, or respectively b, c, d are printed by the printing elements A, or respectively B, C, D. FIG. 3 shows clearly the problem which occurs if dot-shaped pixels are printed with a printing head of this type. A image contains a large number of pixels in which each pixel contains a number of image half tones or color intensities. As a result of geometrical and/or electrical inaccuracies in the various printing elements of the printing head (the geometrical shape and or the resistance values can vary for each printing element) the pixel printed by a printing element does not have a pure geometrical round or square shape. The uniform shape of the geometrical pattern is often disturbed as depicted in the pixel assembly b, c and d. This has the result that the optical density within an assembly of pixels is often disturbed, as a result of which, on the one hand, within the assembly of pixels small unprinted spots occur, but a clear vertical band structure is also produced in the plate. Each assembly of pixels which is printed by the same printing element forms, as it were, a separate band in the plate. Furthermore gaps also occur between the successive bands as a result of inaccurate positioning. Viewed over the whole image these gaps then form an annoying pattern of successive vertical lines which, certainly in the case of a color plate, disturb the image.

The invention now offers a number of methods of reducing the effect of the abovenamed faults in a printed image. The methods have in common that the printing stroke is greater than the pixel pitch. As a result of this, pixels are now covered by more than one printing element within the same line. If therefore in at least one strip of pixels which extends transversely to the printing line direction and which for each image line contains several pixels which are each covered by m ($2 \leq m \leq N$) printing elements, the possibility is created of causing that pixel to be printed by one or more of these m printing elements.

The methods according to the invention are in the main to be distinguished in four embodiments, viz.:

(1) Allocation of one of the said m printing elements according to a predetermined distribution pattern to each pixel in such a strip, printing of each of the pixels by means of the energising of each of the allocated printing elements under control of the control signal generated for that pixel.

(2) Generation of a distribution pattern for each picture line to be printed in such a strip, according to which distribution pattern one of the said m printing elements is allocated to each pixel in any strip, and printing of each of the pixels by means of the energising of each of the allocated printing elements under control of the control signal generated for that pixel.

(3) Allocation of p (2≦p≦m) of the said m printing elements according to a predetermined distribution pattern to each pixel in such a strip, and printing of each of the pixels with a portion of the intensity of the pixel print value for that point, which portion is determined either according to a predetermined distribution code or according to a distribution code generated for that image line.

(4) Generation of a distribution pattern for each image line to be printed from such a strip, according to which distribution pattern p (2≦p≦m) of the printing elements are allocated to each of the pixels in such a strip, and printing of each of the pixels with a portion of the intensity of the pixel print value for that point, which portion is determined according to a distribution code generated for the relevant picture line.

Figure 4:
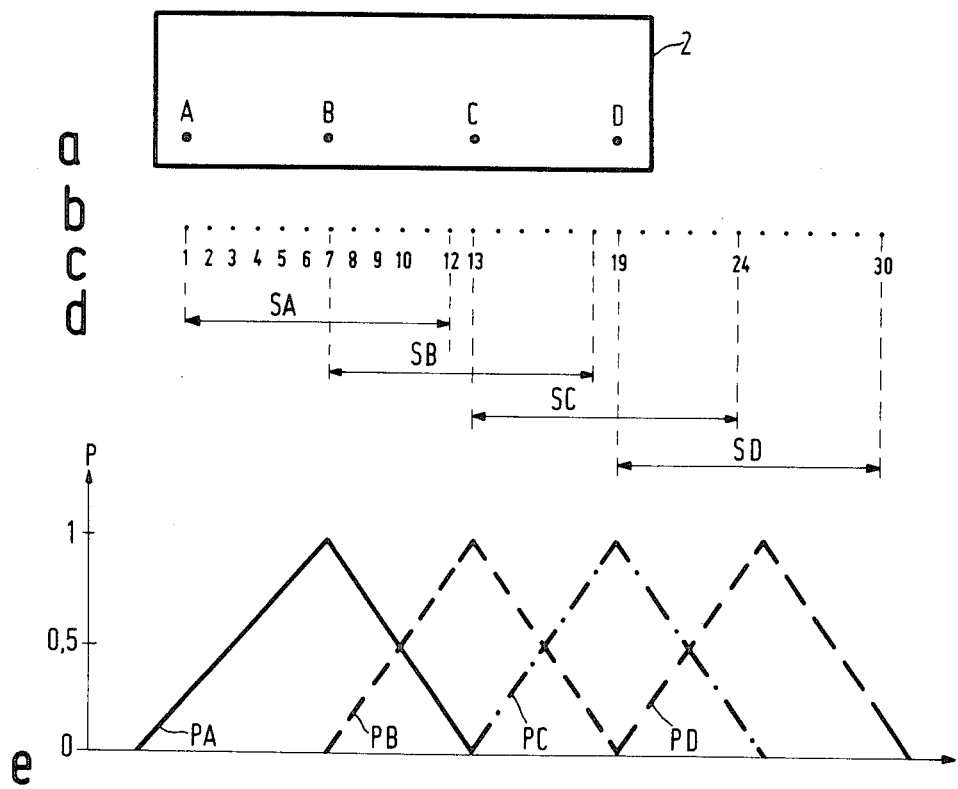

These various methods will now be described in more detail. The FIGS. 4a to e incl. illustrate exemplary embodiments of the methods 2, 3 and 4. FIG. 4a shows a per se known printing head 2 of a thermal printing device. FIG. 4b shows a row of 30 pixels which represent the 30 positions covered by the printing head 2 and FIG. 4c gives numbers to the successive positions of the pixels in FIG. 4b. FIG. 4d illustrates the distance which is covered in this exemplary embodiment by the various printing elements during one complete printing stroke. From FIG. 4 it can clearly be deduced that in this exemplary embodiment of a method according to the invention the printing stroke now comprises substantially twice the length of the printing element pitch. In relation to the usual printing stroke this therefore signifies a printing stroke which is substantially twice as large. With printing element A it is now possible to print at the positions 1 to 12 incl., while with the printing element B the positions 7 to 18 incl. can be printed. The printing element C or respectively D can print the positions 13 to 20 incl. or respectively 19 to 30 incl. This therefore implies that, for example, the positions 7 to 12 can be printed both by printing element A and by printing element B. As a result of this, the assemblies of pixels which are covered by the different printing elements will overlap each other, as a result of which the strip pattern described above is suppressed and as a result of which optical variations in density are smoothed out.

It will be clear that the method according to the invention is not limited to a printing stroke which is substantially equal to twice the printing element pitch. The printing stroke may also describe a length of more than twice the printing element pitch. But the printing stroke may also be only a fraction larger than the printing element pitch in a manner such that there is only a strip of two or more pixels which are covered by several printing elements. In this exemplary embodiment the end positions 1 to 6 incl. and 25 to 30 incl. are only serviced by one printing element because of technical limitations.

For each of the pixels to be printed there is generated a first control signal which, depending on the pixel print value, represents a quantity of energy or the time within which energy is supplied to a printing element (the quantity of energy which is supplied per unit time is then fixed in this latter instance). In view of the fact that several printing elements are now covered according to the invention, the quantity of energy (or time) stored in that first control signal should be distributed over one or more of the printing elements which cover the relevant position. The method according to the invention provides several options for this purpose, such as the determination per position of weighting factors for each printing element or for p of the m printing elements which cover the position, or the establishment of a fixed distribution pattern in which a series of positions to be printed are assigned to each printing element, which series of positions is then distributed over the path described by the relevant printing element.

A boundary condition for the determination of that weighting factor ($P_{ij}$) is that the total sum of the weighting factors summed over all (p) printing elements (i) which cover a certain position (j)

$$\sum_{i=1}^{p} P_{ij} = c$$

(where 2≦p≦m, and m is the number of printing elements which cover the position j) must be a constant c for that position. The constant has a value 1≦c≦1.5 because the given pixel must of course be printed undiminished in that position. The weighting factors are predetermined or are, for example, determined by means of a probability distribution. A common probability distribution is, for example, a delta probability distribution or a sinusoidal probability distribution. FIG. 4e shows a delta probability distribution for the positions 1 to 30 incl. for the printing elements A, B, C and D. PA represents the weighting factors for the positions 1 to 12 incl. for printing with printing element A. PB, PC and PD represent the weighting factors for the printing of the respective positions 7 to 18 incl., 13 to 24 incl. and 19 to 30 incl. by the respective printing elements B, C and D. From this FIG. 4e it can be deduced that printing element A prints position 7. Position 10 is printed both by printing element A and by printing element B. For this position 10 the energy stored in the first control signal for this position is distributed equally over the two printing elements A and B. Because position 10 is now covered by two printing elements the chance that in this position a fault in the optical density occurs as a result of an inaccuracy in a printing element (for example, printing element B) is considerably reduced. Furthermore, for each line of the image to be printed a new set of weighting factors is generated. As a result of this the optical fault viewed over all the lines of the image will then be further reduced.

In an analogous manner to that in which weighting factors are determined for the distribution of the energy, it is also possible to determine a distribution pattern for the selection of p of m printing elements.

Making use of a probability distribution is, of course, only one way of generating weighting factors. Another way of assigning weighting factors is depicted in FIG. 4f. In this case a weighting factor which represents a portion of the energy is assigned per position to the printing elements which cover that position. Thus, for example, for position 14, which is served both by printing element B and printing element C, a weighting factor of ⅔ is assigned to the printing element B and a weighting factor ⅓ is assigned to the printing element C. In printing the position 14, ⅔ of the energy of the first control signal is then fed to the printing element B and ⅓ of the energy to the printing element C. The sum of a series of weighting factors per position is in this case chosen as equal to 1. Of course this sum may also be somewhat larger than 1, for example, weighting factors of 0.6 and 0.5 for one position are also permissible. The total energy supplied to all the printing elements which service that position may be somewhat larger than the energy from the first control signal because allowance is made, for example, for heating-up effects in the various printing elements.

The series of weighting factors is, for example, stored in the memory of the printing device, which memory then fulfils the function of a distribution pattern generator.

FIG. 5 shows the operations carried out in a first preferred embodiment of a method according to the invention on the basis of a flow chart. In this first preferred embodiment use is made of a probability distribution for the generation of the weighting factors. It is assumed that printing is only done in a single color (for example black). The printing of several colors will be dealt with later. As already noted in the description of FIG. 2, the printing head is controlled by a CPU. In order to print a image which is composed of dot-shaped or line-shaped image elements, a suitable program for this purpose is called up from the memory and started (20) under the control of the CPU once a user or a data processing unit has given the necessary instruction. At the start of the execution of the program a line counter, which counts the number of lines to be printed, is set to a starting position, for example the "zero" position. A weighting factor is then determined on the basis of a probability distribution for each position situated within the line to be printed. The weighting factor is determined, for example, on the basis of a delta distribution such as depicted in FIG. 4e. These weighting factors are generated by a distribution code generator which is part of the CPU and the read memory. The generated weighting factors for each position are stored in the read write memory. After the generation of the weighting factors an index flag is set to the "zero" position (23). This index flag serves to indicate within which position ranges the printing head is located. Thus, in the exemplary embodiment in which the printing stroke extends over substantially twice the length of the printing element pitch, the index flag has two positions, viz. the position "0" for the first half of the printing stroke and the position "1" for the second half of the printing stroke. Then the information to be printed in the first line is called up (24) (for example, via the input/output interface or from the memory), and on the basis of the information to be printed there is called up a series of first control signals ($I_i$) which represent a quantity of energy for the activation of a printing element for each of the positions (i) to be printed in the line, or the time within which the activation must take place. The series of first control signals is determined under the control of the CPU. This series of first control signals is stored in a memory location allocated for the purpose, termed a "printing table". Then a position counter is set to the starting position (25), for example the "0" position. This position counter counts the number of positions in one position of the pitch flat (for example, 6 as illustrated in FIG. 4b). Then an operation is carried out (26) in which the weighting factor which is stored in the memory for the positions and a certain printing element is applied to the first control signal for these positions. This operation will be explained by reference to the example given in FIG. 4. When the position counter is in the starting position, printing element A covers position 1, printing element B covers position 7 and printing element C or D covers position 13 or 19 respectively. The first control signals $I_1$, $I_7$, $I_{13}$ and $I_{19}$ for the positions 1, 7, 13 and 19 are now called up from the printing table. The weighting factors for the various positions and the various printing elements are $P_{A1}$, $P_{B7}$, $P_{C13}$ and $P_{D19}$, and these values are also called up from the memory. The CPU now performs the following operations.

$$P_{A1} \circ I_1 = S_{A1}$$

$$P_{B7} \circ I_7 = S_{B7}$$

$$P_{C13} \circ I_{13} = S_{C13}$$

$$P_{D19} \circ I_{19} = S_{D19}$$

(where o stands for "acts on"; this may be a logic "AND" operation or a multiplication). The result of this operation produces a second control signal $S_{j,i}$ for the relevant position. The second control signal then represents the quantity of energy which is supplied to a certain printing element (j) which covers the position (i) (or the length of time within which energy is supplied to the printing element). The set of second control signals is stored in a buffer. Subsequently (27) the printing elements are activated under the control of their respective second control signals for printing information on the paper. The setting of the position counter is then changed by one unit (28) (increased or reduced depending on the starting position of the position counter) and a check is made (29) as to whether all the positions to be printed in one setting of the index flag have been covered, i.e. whether the position counter has reached its final setting. If the position counter has not reached its final setting (N), the printing head is displaced to a next adjacent position and the step 26 is repeated for that next position. Again referring to the example in FIG. 4 the following second control signals are now determined:

$$P_{A2} \circ I_2 = S_{A2}$$

$$P_{B8} \circ I_8 = S_{B8}$$

$$P_{C14} \circ I_- = SC_{14}$$

$$P_{D20} \circ I_{20} = SD_{20}$$

Then, in step 27 the printing elements are activated under the control of the second control signals $S_{A2}$, $S_{B8}$, $S_{C14}$ and $S_{D20}$. The steps 26, 27, 28, 29 and 33 are repeated until the position counter has reached its final position and all the positions for the setting "0" of the index flag have consequently been covered by the printing head. If the position counter has reached its final position (Y) in step 29, a check is made as to the setting the index flag is in (30). If it is the "0" position, step 31 is proceeded to, and if it is the "1" position, then step 38 is proceeded to. In step 31 a new set of weighting factors is determined for the positions which are covered in a new position of the index flag. This is necessary because positions are now covered which were already covered by another printing element in the previous setting of the index flag. For the example given in FIG. 4, in which a delta probability distribution is used and the index flag has only two settings, this new probability factor can easily be determined from the relationship $(z - P_{j,i})$, where z represents a constant value which is set equal to 1 for the present example. In certain circumstances z may also be chosen as larger than 1 in order to make a correction for certain switching-on effects such as, for example, heating-up effects.

However, since the printing head has already been displaced over a number of positions, this should be taken into account in determining the second control signals. To this end a shift operation (32) is carried out on the first control signals in the printing table and on the weighting factor in the memory. Again referring to the example in FIG. 4, this means that the positions 7 to 30 incl. are now being covered. Printing element A now covers the positions 7 to 12 incl., printing element B the positions 13 to 18 incl., printing element C or D the positions 19 to 24 incl. or 25 to 30 incl. respectively. Thus, the shift operation is actually a modulo 6 shift operation so that, for example, $I_7$ is now denoted as $I_1$ and $P_7$ is denoted as $P_1$. This is necessary because a return will be made to step 25 where the position counter is again set to a starting position and to step 26, where the operations described for it are performed again. Subsequently (34), the printing head is displaced to an adjacent position and the index flag is set to a new position (35), in this example the position "1". The program is then resumed from step 25. The various subsequent steps are repeated for the positions to be printed in position "1" of the index flag. However, at step 30, where a check is made as to whether the index flag is in the position "0", the answer will now be negative and this being so, step 38 will be proceeded to at this point. In this step 38 a check is made as to whether all the lines to be printed have already been covered. This is undertaken, for example, by interrogating the position of the line counter and checking whether a previously set position which specifies the number of lines to be printed has already been reached. If all the lines to be printed have been covered (Y), then the printing process is terminated (39). If, however, all the lines to be printed have not yet been covered (N), a return stroke pulse is supplied (36) to the printing head which sets it to its starting position and the paper is displaced so that a next line can be covered. Then (37) the line counter is changed by one position (increased or reduced) and the method is repeated from step 22 for the next line to be printed.

Figure 6:
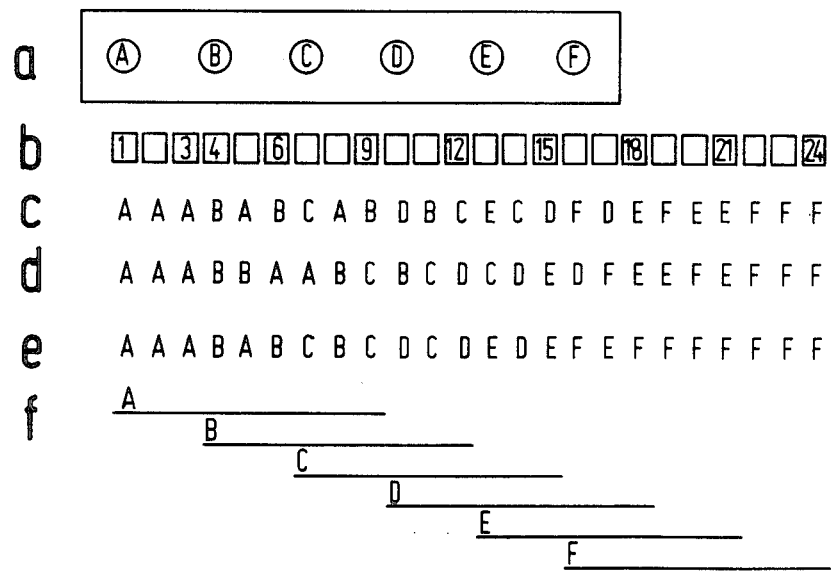

In the event that color printing has to be done, the program has to be modified in a few respects. Thus, for example, in step 24 only that information which relates to the color to be printed is called up, and only first control signals are determined for the relevant color. If, for example, a colored video image is being printed, the recognition of the colour to be printed can be derived from the RGB signals. The program as depicted by the flow chart in FIG. 6 is then executed for each of the primary colours RGB.

It will be clear that the flow chart depicted in FIG. 5 only provides an exemplary embodiment, to which the invention is not restricted. Thus, it is also possible, for example, to make another choice of probability distribution and/or to choose a printing stroke of more than twice the length of the element pitch, in which case the index flag has more than two positions. The positions of the index flag can then be indicated and updated, for example, by means of an adjustable counter. In another embodiment of a method according to the invention it is possible, for example, to print in a first position of the index flag during the forward stroke of the printing head and to print in a second position of the index flag during the return stroke of the printing head.

The use of a probability distribution is only a preferred embodiment of a method according to the invention. It is also possible to choose a fixed distribution pattern (method 1) as will be described below. With a fixed distribution pattern, which printing element will service a position to be covered is permanently established. An example of this is illustrated in FIG. 6, in which FIG. 6a again depicts a known printing head of a thermal printer with six printing elements (A, B, C, D, E, F). FIG. 6b shows the 24 different positions which are covered during one printing stroke. In this example, during one printing stroke, the printing head moves over a distance which is substantially equal to three times the element pitch (this latter point therefore implies that the index flag has three positions). The positions which are covered by the various printing elements during a printing stroke are represented by means of line segments in FIG. 6e. The letter associated with the line segment indicates the printing element. Thus, the positions 1 to 9 incl. are covered by printing element A.

FIG. 6c, 6d and 6e show a first, second and third preferred embodiment respectively of such a fixed distribution pattern. In the FIGS. 6c, 6d and 6e the letters underneath the various positions as shown in FIG. 6b indicate which printing element of the printing head services the various positions. If the distribution pattern as depicted in FIG. 6c is chosen, then the successive positions 7, 8 and 9, for example are in each case serviced by a different printing element, viz. C, A and B. This also applies to the positions 10 to 18 incl. FIG. 6e shows a distribution pattern in which the printing elements are energised alternately within a strip. Because successive positions are now serviced by different printing elements, effects due to geometric inaccuracies in a printing element are averaged out and the printing elements are allowed some time to cool down between successive activations.

The distribution pattern stipulating which printing element will service a position during the printing is, for example, stored in the memory of the printing device, which memory acts as a selection unit for the selection of one of m printing elements.

The printing of the information by making use of a fixed distribution pattern will now be described on the basis of the flow chart in FIG. 7. It is again assumed that only one color is being printed. After the printing process has been started (50), a line counter, which counts the number of lines to be printed, is set to a starting position, for example the 0 position. Subsequently (52), the information to be printed in a first line is called up under the control of the CPU, and on the basis of the information to be printed a series of first control signals ($I_j$) is determined (in an analogous manner to that described for step 24 of the program depicted in FIG. 5) and stored in a memory location allocated for the purpose, termed the "printing table". Then (53), under the control of the CPU, a distribution pattern is called up from the memory, for example the distribution pattern given in FIG. 6d. Subsequently (54), a position counter is set to a starting position, for example the "0" position. This position counter counts the number of positions within a line, for example 24 as shown in FIG. 6b. After the setting of the position counter, an operation (55) is carried out in which second control signals for the activation of the printing elements are determined. A second control signal $S_j$ is determined for a position j by $S_j = E \cdot I_j$, where E represents the printing element given by the distribution pattern which services the position j. Referring to the example in FIG. 6, in the starting position of the position counter, the positions 1, 4, 7, 10, 13 and 16 are covered.

If the distribution pattern in FIG. 6d is chosen, the second control signals for the starting position of the position counter are:

$S_1 = A \cdot I_1$ $S_4 = B \cdot I_4$ $S_7 = 0$ $S_{10} = 0$ $S_{13} = 0$ $S_{16} = 0$ The second control signals ensure that all the allocated printing elements are energised at the respective positions. For these positions the intensity of the second control signal is therefore equal to that of the first control signal.

After the determination of the second control signals, the printing elements are activated (56) under the control of the second control signals for printing the information. Referring to the example chosen, in the starting position of the position counter, only the elements A and B are activated since the other second control signals $S_7$, $S_{10}$, $S_{13}$, $S_{16}$ have a value of 0. This is because the positions 7, 10, 13, 16 are not being selected by the printing elements which are located in these positions at this instant (for example, position 7 is serviced by printing element A which is now in position 1). Subsequently (57) the setting of the position counter is increased by 1, and then (58) a check is made as to whether all the positions in the line have been covered. If this is not the case (N) the printing head is displaced (59) and the printing program is repeated from step 55 for the next positions to be covered. Again referring to the example, these are the positions, 2, 5, 8, 11, 14 and 17. The second control signals are now:

$S_2 = A \cdot I_2$ $S_5 = B \cdot I_5$ $S_8 = 0$ $S_{11} = 0$ $S_{14} = 0$ $S_{17} = F \cdot I_{17}$ The steps 55, 56, 57, 58, 59 are repeated until it is established at step 58 that all the positions of the line to be printed have been covered. If all the positions have been covered (Y), a check is made (60) as to whether all the lines to be printed have been covered (position of line counter). If all the lines to be printed have been covered (Y), the printing program is terminated (63). If not (N), a return stroke impulse is transmitted to the printing head (61) which sets it to the starting position and the paper is displaced. Then (62) the setting of the line counter is changed by 1 (increased or decreased) and the printing program is repeated from step 21 for a following line to be printed.

Such a distribution pattern for assigning m printing elements to each position which is covered by m printing elements is either predetermined and stored in a memory or generated by means of a distribution pattern generator (composed of the CPU and the memory). Preferably, this distribution pattern is the same for every image line, which simplifies the control of the printing process. The distribution pattern genera-tor operates, for example, by making use of a probability value distribution.

In determining this distribution pattern, several printing head parameters can be taken into account. These parameters are, for example, geometrical faults in the printing head, heating-up and cooling-down effects, difference from head to head in the resistance values of the various printing elements. Of course, in determining the distribution pattern account must be taken of the length of the printing stroke to enable all the positions to be serviced.

To determine the distance over which the printing stroke extends, it is advantageous to choose this distance as a whole multiple of the printing element pitch (n x printing element pitch). An upper limit for the value of n is determined, for example, by choosing n as not larger than the number of positions within one element pitch. A favorable solution for a printing head with six printing elements and a printing element pitch of 4 is, for example, a printing stroke of 4× the printing element pitch.

What is claimed is:

1. A method for the line-wise printing of an image composed of an assembly of picture elements (pixels) by means of a printing head including a row of N (N≧2) printing elements arranged along an image line at a mutual distance from each other, said mutual distance being greater than the distance between two successive pixels in the same image line, the printing head being moved during a printing stroke in the direction of an image line to be printed, the method comprising: generating a first control signal for each pixel to be printed for the single-colour printing of that pixel, wherein the printing stroke is larger than the distance between two neighboring printing elements and for at least one strip of pixels which extends transversely to the image line direction and which for each image line contains several pixels which are each covered by m(2≦m≦N) printing elements, there is allocated to each pixel situated in the same image line and in such a strip one of said m printing elements, which allocation is achieved by printing a pixel situated later in the image line by means of a printing element disposed earlier in the said row and by printing a pixel situated earlier in the image line by means of a printing element disposed later in the row, and each pixel being printed by energising the printing element allocated to it under the control of the respective first control signal.

2. Method according to claim 1, wherein the said allocation of one of the said m printing elements is achieved according to a predetermined distribution pattern.

3. Method according to claim 1, wherein, in the event that a strip contains more than two pixels, the said allocation of one of the said m printing elements is achieved according to a distribution pattern that is generated for each image line to be printed.

4. Method according to claim 2 or 3, wherein the distribution pattern for each image line of the image to be printed is invariant.

5. Method according to claim 4, wherein, in the event that m=2, the said earlier and said later printing element is alternately energised by the distribution pattern.

6. A method for the line-wise printing of an image composed of an assembly of pixels by means of a printing head including a row of N(N≧2) printing elements arranged along an image line at a mutual distance from each other, said mutual distance being greater than the distance between two successive pixels in the same image line, the printing head being moved during a printing stroke in the direction of an image line to be printed, said method comprising: generating a first control signal for each pixel to be printed for the single-colour printing of that pixel, said first control signal having an intensity matched to the pixel print value of that pixel, wherein the printing stroke is larger than the distance between two neighboring printing elements, and for at least one strip of pixels which extends transversely to the image line direction and which for each image line contains several pixels which are each covered by m(2≦m≦N) printing elements, which pixels in such a strip are printed by p (2≦p≦m) printing elements successively, generating for each pixel printed by the p printing elements, for activating each of the p printing elements, a second control signal on the basis of a portion of the intensity of the first control signal for that pixel, and wherein the sum of the intensities included in all of the second control signals for the same pixel is at least equal to the intensity in the first control signal for that pixel.

7. Method according to claim 6, wherein the intensity contained in the first control signal for each pixel belonging to such a strip is divided into a portions according to a predetermined distribution code, and the p printing elements which in each case print each pixel in such a strip are selected according to a predetermined pattern from the said m printing elements.

8. Method according to claim 6, wherein for each pixel in such a strip and belonging to the same image line a distribution code is generated according to which the intensity contained in the first control signal for that pixel is divided into p portions, and the p printing elements which in each case print each pixel in such a strip are selected according to a predetermined pattern from the said m printing elements.

9. Method according to claim 6, wherein a distribution pattern is generated for each pixel in such a strip and belonging to the same image line according to which from the m printing elements which cover that pixel p are selected, and the intensity contained in the first control signal for each pixel belonging to such a strip is divided into p portions according to a predetermined distribution code.

10. Method according to claim 7 or 8, wherein the distribution code is invariant for each image line.

11. Method according to claim 8, wherein the distribution code and the distribution pattern is invariant for each image line.

12. Method according to claim 7, 8, 9 or 11, wherein the distribution code for each pixel (j) to be printed contains p weighting factors ($P_{ij}$) ($1 \leq i \leq p$), and for which the sum of all the weighting factors $$\left( \sum_{i=1}^{p} P_{ij} = c \right)$$

is equal to a constant value c ($1 < c < 1.5$).

13. Method according to claim 12, wherin the p weighting factors for the same pixel are determined according to a probability distribution, and the constant c is equal to 1.

14. Method according to claim 13, wherien a set of probability values made up of all of the weighting factors of all of the pixels m which are covered by one given printing element (i) (($P_{ij}$|i fixed, j variable )) takes the form of a delta or sinusoidal probability distribution.

15. Method according to claim 7, 8 or 9 wherein the distance over which the printing head is moved during a printing stroke is almost equal to a whole member of times (n) the mutual distance between two successive printing elements in the printing head.

16. Method according to claim 15, wherein the said whole number of times (n) is a value which is smaller or at most equal to the number of pixels which fits into the space between two successive printing elements (printing element pitch) of the printing head.

17. A printing device for the line-wise printing of an image composed of an assembly of pixels comprising, a printing head having a row of N (N≧2) printing elements arranged along an image line at a mutual distance from each other, said mutual distance being greater than the distance between two successive pixel positions in the same image line which is to be printed, the printing head including means for displacing the printing head during a printing stroke in the direction of the image line which is to be printed, a first control signal generator for the generation of a first control signal for each pixel to be printed, means connecting the first signal generator to the printing head in order to supply first control signals to the printing elements, wherein the displacing means provide for the displacement of the printing head within a complete printing stroke over a distance which is greater than the distance between two neighboring printing elements, and a selection unit for allocating, in at least one strip of pixel positions which extends transversely to the image line and which for each image line contains several pixel positions which can each be printed by m (2≦m≦N) printing elements, at each of the pixel positions situated on the same image line in such a strip, one of the m printing elements by selecting for a pixel position situated in an image line a printing element disposed earlier in the same row and by selecting for a pixel position situated earlier in that image line a printing element disposed later in the said row, the first control signal generator being connected to the selection unit to supply the first control signals to the selected printing elements.

18. Printing device according to claim 17, wherein the selection unit includes a first memory which stores a distribution pattern whereby one of the said m printing elements can be selected at each of the pixel positions.

19. Printing device according to claim 17, wherein the selection unit includes a distribution pattern generator for the generation of a distribution pattern whereby for each of the pixel positions in such a strip, one of the said m printing elements can be selected.

20. A printing device for the line-wise printing of an image composed of an assembly of pixels comprising, a printing head having a row of N(N≧2) printing elements arranged along an image line at a mutual distance from each other, said mutual distance being greater than the distance between two successive pixel positions in the same image line which is to be printed, the printing head including means for displacing the printing head during a printing stroke in the direction of an image line to be printed, a first control signal generator for the generation of a first control signal for each pixel to be printed, each first control signal having an intensity which is matched to the pixel printing value of that pixel, means connecting the first control signal generator to the printing head for the allocation of first control signals to the printing elements, wherein the displacing means provide for the displacement of the printing head within a full printing stroke over a distance which is greater than the distance between two neighboring printing elements, and s second control signal generator connected to the first control signal generator for the generation of second control signals for the printing of pixel positions in at least one strip of pixel positions which extends transversely to the image line direction and which for each image line contains several pixel positions which can each be printed by m (2≦m≦N) printing elements, the second control signal generator providing for the generation of p (2≦p≦m) second control signals for each pixel position in such a strip, each of the p second control signals being capable of being generated for the same pixel position on the basis of a portion of the intensity of the first control signal for that pixel position and the sum of the intensities contained in all of the second control signals for the same pixel being at least equal to the intensity in the first control signal for that pixel position, and a selection unit for the selection of p different printing elements from the said m printing elements, the selection unit being connected to the printing head and to the second control signal generator in order to supply the said p second control signals to the said p printing elements.

21. Printing according to claim 20, wherein the second control signal generator includes a second memory which stores a distribution code according to which the said p portions are determined for each pixel position in such a strip, and the selection unit includes a third memory in which the distribution pattern is stored according to which the said p printing elements can be selected at each of the pixel positions in such a strip.

22. Printing device according to claim 20, wherein the selection unit includes a distribution pattern generator for the generation of a distribution pattern whereby, for each of the pixel positions in such a strip, the said p printing elements can be selected, and the second control signal generator contains a second memory in which a distribution code is stored according to which the said p portions are determined for each pixel position in such a strip.

23. Printing device according to claim 20, wherein the selection unit includes a distribution pattern generator for the generation of a distribution pattern according to which the said p printing elements can be selected for each of the pixel positions in such a strip, and the second control signal generator includes a distribution code generator for the generation of a distribution code according to which the said p portions for each pixel position in such a strip can be determined.

24. Printing device according to claim 23, wherein the distribution code is formed from p weighting factors ($P_{ij}$) ($1 \leq i \leq p$), the sum of all the weighting factors $$\left( \sum_{i=1}^{p} P_{ij} = c \right)$$

being equal to to a constant value c ($1 \leq c \leq 1.5$).

25. Printing device according to claim 23 or 24, wherein the distribution code generator is a probability value generator.

26. Printing device according to one of the claim 17 or 20, wherein the printing head includes thermal printing elements.

* * * * *